Oct. 15, 1968 E. HENRY-BIABAUD 3,405,784
DISC AND SUPPORT MEANS THEREFOR
Filed April 25, 1966 2 Sheets-Sheet 1
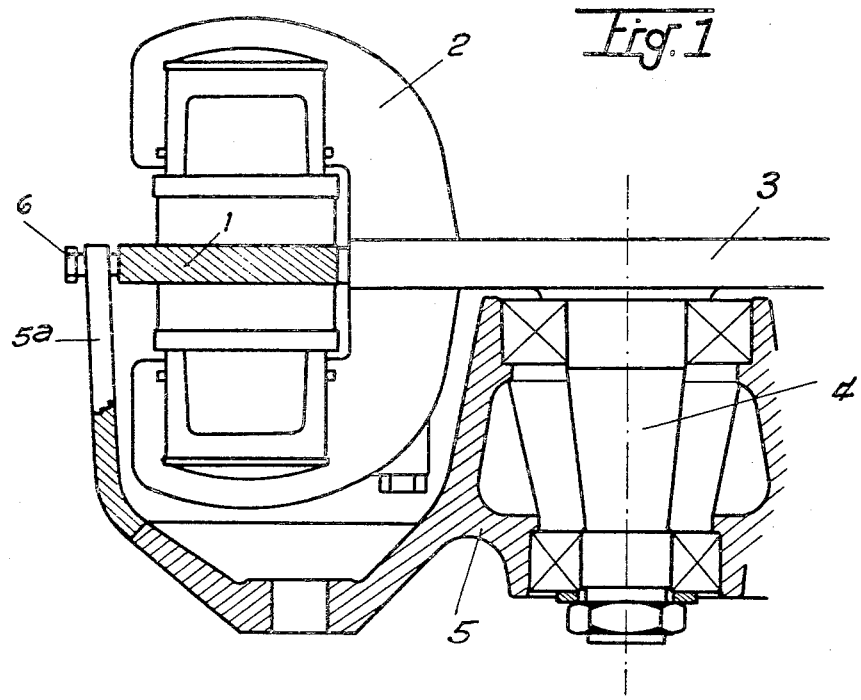
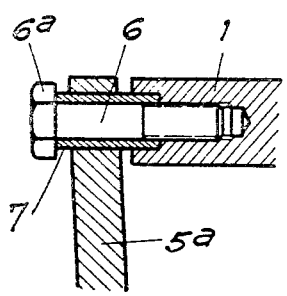 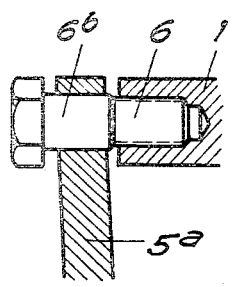 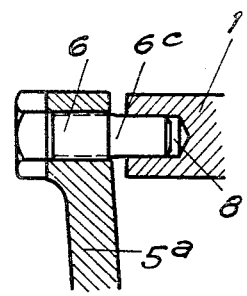
INVENTOR
EDMOND HENRY BIABAUD
BY:
Karl F. Ross
Attorney

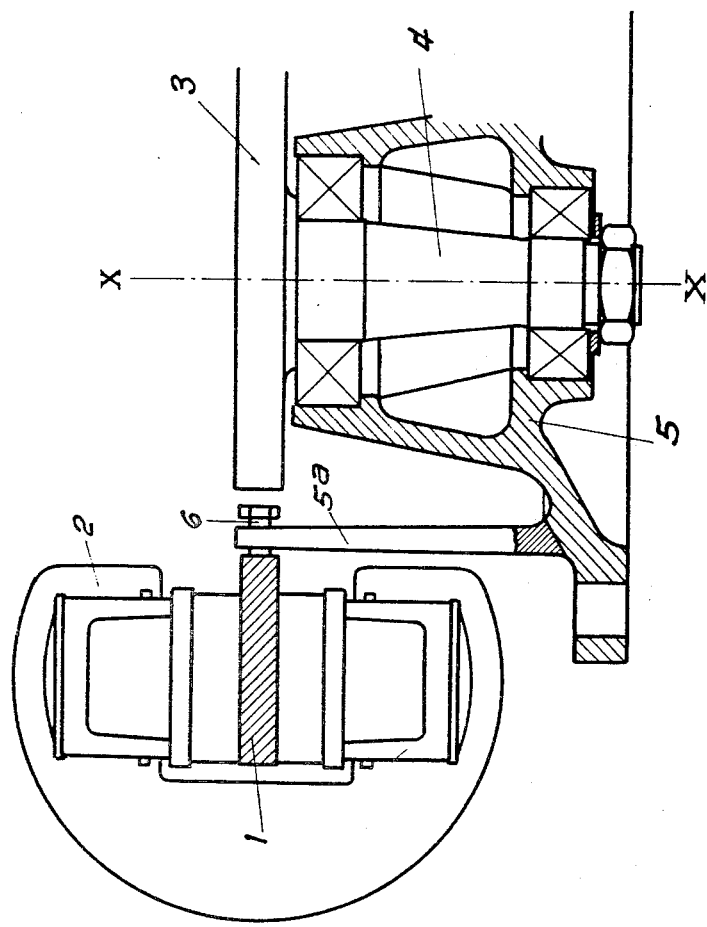

United States Patent Office 3,405,784
Patented Oct. 15, 1968

3,405,784
DISC AND SUPPORT MEANS THEREFOR
Edmond Henry-Biabaud, Paris, France, assignor to Societe Anonyme Andre Citroen, Paris, France, a company of France
Filed Apr. 25, 1966, Ser. No. 545,084
Claims priority, application France, Apr. 30, 1965, 3,206
3 Claims. (Cl. 188—18)

ABSTRACT OF THE DISCLOSURE

A disk brake wherein a generally crown-shaped disk support is rotatable about an axis and has a generally cylindrical axially extending rim secured to the outer periphery of an annular disk lying in a plane perpendicular to the axis within the rim, the brake yoke being mounted upon a nonrotatable support and having brake pads or shoes at least partly received in the region surrounded by the rim for engagement with the disk, while radially extending bolts angularly spaced about the rim and the disk join the latter to the former so as to prevent axial displacement of the disk but permit relative radial movements of the disk and the crown.

This invention relates to disc brakes.

In most previously suggested disc brakes, the brake disc is supported by a rotary member or hub coaxial with the disc.

Hitherto, the disc has been fixed to the hub so that no relative motion is possible, especially in the radial direction. The action of braking, however, causes the disc to expand radially, so that the hub is subjected to a heavy bending stress, which may result in distortion or even breakage.

The present invention relates to an improvement in disc brakes, the purpose of which is to eliminate the overstress due to this expansion.

According to the invention there is provided in a disc-brake arrangement. An annular brake disc having an inner and an outer periphery, a rotary component including a cylindrical crown, and connecting means between the crown and the brake disc, the connecting means allowing relative radial movement between the brake disc and the rotary member.

Various embodiments of disc brakes in accordance with the invention will now be described with reference to the accompanying diagrammatic drawing in which:

FIG. 1 is an axial section of part of a disc brake;

FIG. 2 is a section, drawn to an enlarged scale, of one detail thereof;

FIG. 3 is similar to FIGURE 2 but shows a modification;

FIG. 4 is similar to FIGURE 2 and shows a second modification; and

FIG. 5 is similar to FIGURE 1 and shows an alternative form of the brake.

In FIG. 1, a disc 1 is fitted between jaws 2 of a caliper or yoke equipped in the usual way with pads or brake shoes that can be applied to both faces of the disc 1. The jaws 2 are rigidly connected to a support 3 disposed in the plane of disc 1, this support being rigid with a spindle 4, on which is mounted a rotary member 5 having a crown-shaped rim portion 5a of generally cylindrical shape and made up of axially extending angularly spaced crests. The axially fixed disc 1 is secured externally to this crown, at one or more points, with radial clearance, mounting member 5, 5a being journaled on axle 4.

The connection between the crown 5a and the disc 1 is made at each point of fastening by means which permit radial displacement of the disc and leave unobstructed the gap between the outer disc periphery and the rim 5a.

In FIG. 2, each of the connection points includes one or more bolts 6, screwed radially into the disc 1 and provided with a sleeve 7 which is free to slide within a hole in the crown, the distance between bolt head 6a and the disc being, for this purpose, larger than the thickness of the crown.

The example shown in FIG. 3 is generally similar to that illustrated in FIG. 2, but the sleeve 7 has been dispensed with and the cylindrical bearing face 6b of bolt 6 slides directly in the crown.

In the example shown in FIG. 4, the bolt 6 is screwed into the crown 5a and has a cylindrical end or tail 6c, which is free to slide within a bore 8 in disc 1.

The crown 5a may be joined to the outer periphery of the disc 1, as in FIGURE 1, or to its inner periphery, as seen in FIGURE 5.

It should be emphasized that the invention is not limited to the forms described and illustrated, but includes all modifications thereof except as otherwise limited in the appended claims.

I claim:

1. A disk-brake assembly comprising a rotatable generally crown-shaped mounting member centered on an axis and having an axially extending generally cylindrical rim portion surrounding said axis; an annular disc member lying in a plane perpendicular to said axis and having an outer periphery spacedly received within said rim portion; a set of elongated connectors angularly spaced about said disc member for securing said members together along the outer periphery of said disc member to prevent relative axial movement of said members while permitting radial movements of said disc member relative to said support member, said connectors extending radially through said rim portion into said disc member, each of said connectors being radially slidable in one of said members and radially fixed in the other of said members while normally leaving an unobstructed radial clearance between said rim portion and said outer periphery; and a nonrotatable brake yoke surrounded at least in part by said rim portion of said support member and having brake pads engageable with opposite faces of said disc member.

2. An assembly as defined in claim 1 wherein said connectors are bolts each having relatively smooth shank portions slidably received in said one of said members and a threaded portion screwed into said other of said member.

3. An assembly as defined in claim 1 wherein said brake yoke is provided with a support disposed in the plane of said disc member, said mounting member being provided with an axle secured to said support.

References Cited

UNITED STATES PATENTS

| 1,541,411 | 6/1925 | Davis. |
| 2,946,408 | 7/1960 | Peras _____ 188—73 |
| 3,237,731 | 3/1966 | DuBois _____ 188—218 |
| 3,295,641 | 1/1967 | Eaton et al. _____ 188—218 |

FOREIGN PATENTS

| 1,346,896 | 11/1963 | France. |
| 1,031,337 | 6/1958 | Germany. |

MILTON BUCHLER, *Primary Examiner.*

G. E. A. HALVOSA, *Assistant Examiner.*